(12) United States Patent
Lail

(10) Patent No.: US 6,621,966 B2
(45) Date of Patent: *Sep. 16, 2003

(54) FIBER OPTIC CABLE WITH PROFILED GROUP OF OPTICAL FIBERS

(75) Inventor: Jason C. Lail, Conover, NC (US)

(73) Assignee: Corning Cable Systems LLC, Hickory, NC (US)

( * ) Notice: Subject to any disclaimer, the term of this patent is extended or adjusted under 35 U.S.C. 154(b) by 258 days.

This patent is subject to a terminal disclaimer.

(21) Appl. No.: 09/789,048

(22) Filed: Feb. 19, 2001

(65) Prior Publication Data

US 2001/0007604 A1 Jul. 12, 2001

Related U.S. Application Data

(63) Continuation-in-part of application No. 09/283,080, filed on Mar. 31, 1999, now Pat. No. 6,192,178.

(51) Int. Cl.[7] ................................................. G02B 6/44
(52) U.S. Cl. ...................... 385/114; 385/109; 385/110; 385/111; 385/112
(58) Field of Search .................................. 385/100–114

(56) References Cited

U.S. PATENT DOCUMENTS

| | | | |
|---|---|---|---|
| 4,078,853 A | 3/1978 | Kempf et al. | 350/96.23 |
| 4,185,887 A | 1/1980 | Ferrentino | 350/96.23 |
| 4,878,732 A | 11/1989 | Rohner et al. | 350/96.23 |
| 4,984,859 A | 1/1991 | Fujigaki et al. | 350/96.24 |
| 5,013,127 A | 5/1991 | Bernard | 350/96.23 |
| 5,166,998 A | 11/1992 | Patel | 385/114 |
| 5,177,509 A | 1/1993 | Johansen et al. | 385/105 |
| 5,212,756 A | 5/1993 | Eoll | 385/114 |
| 5,249,249 A | 9/1993 | Eoll et al. | 385/114 |
| 5,293,443 A | 3/1994 | Eoll et al. | 385/114 |
| 5,369,720 A | 11/1994 | Parry et al. | 385/114 |
| 5,487,126 A | 1/1996 | Oestreich et al. | 385/105 |
| 5,531,064 A | 7/1996 | Sawano et al. | 57/204 |
| 5,608,832 A | 3/1997 | Pfandl et al. | 385/112 |
| 5,857,051 A | 1/1999 | Travieso et al. | 385/114 |
| 5,862,284 A | 1/1999 | Paborn et al. | 385/106 |
| 5,878,180 A | 3/1999 | Nothofer et al. | 385/114 |
| 6,014,487 A | 1/2000 | Field et al. | 385/110 |
| 6,064,789 A | 5/2000 | Mills | 385/114 |
| 6,229,944 B1 * | 5/2001 | Yokokawa et al. | 385/114 |
| 6,321,013 B1 * | 11/2001 | Hardwick et al. | 385/114 |

FOREIGN PATENT DOCUMENTS

| | | | | |
|---|---|---|---|---|
| EP | 0495241 A2 | 12/1991 | | G02B/6/44 |
| EP | 0 495 241 A2 | 7/1992 | | G02B/6/44 |
| GB | 2262357 A | 6/1993 | | H01B/11/22 |

* cited by examiner

Primary Examiner—Hemang Sanghavi
(74) Attorney, Agent, or Firm—Timothy J. Aberle

(57) ABSTRACT

A fiber optic cable (10) having a tube assembly (20) therein. Tube assembly (20) includes an optical fiber group (22) in a tube (21). Optical fiber group (22) comprises a medial optical fiber subgroup (23) and lateral optical fiber subgroups (24a, 24b;25a,25b;26a,26b) adjacent thereto. Subgroups (24a,24b;25a,25b;26a,26b) define a step-like profile for maximizing optical fiber packing density of tube assembly (20) and/or defining a high fiber count cable (10). In exemplary embodiments, a diagonal free space is defined as the tube inner diameter minus the diagonal length of the cross-section of the profile of the optical fiber ribbon stack, the diagonal free space being about 2 mm to about 5 mm. In a multi-tube embodiment, diagonal free space can be about 0.5 mm to about 2 mm. In other embodiments, corner fibers can have a delta optical attenuation of less than about 0.05 dB/Km for a wavelength of @1550 nm over a 100 meter length 40" to 70" drum at room temperature.

18 Claims, 3 Drawing Sheets

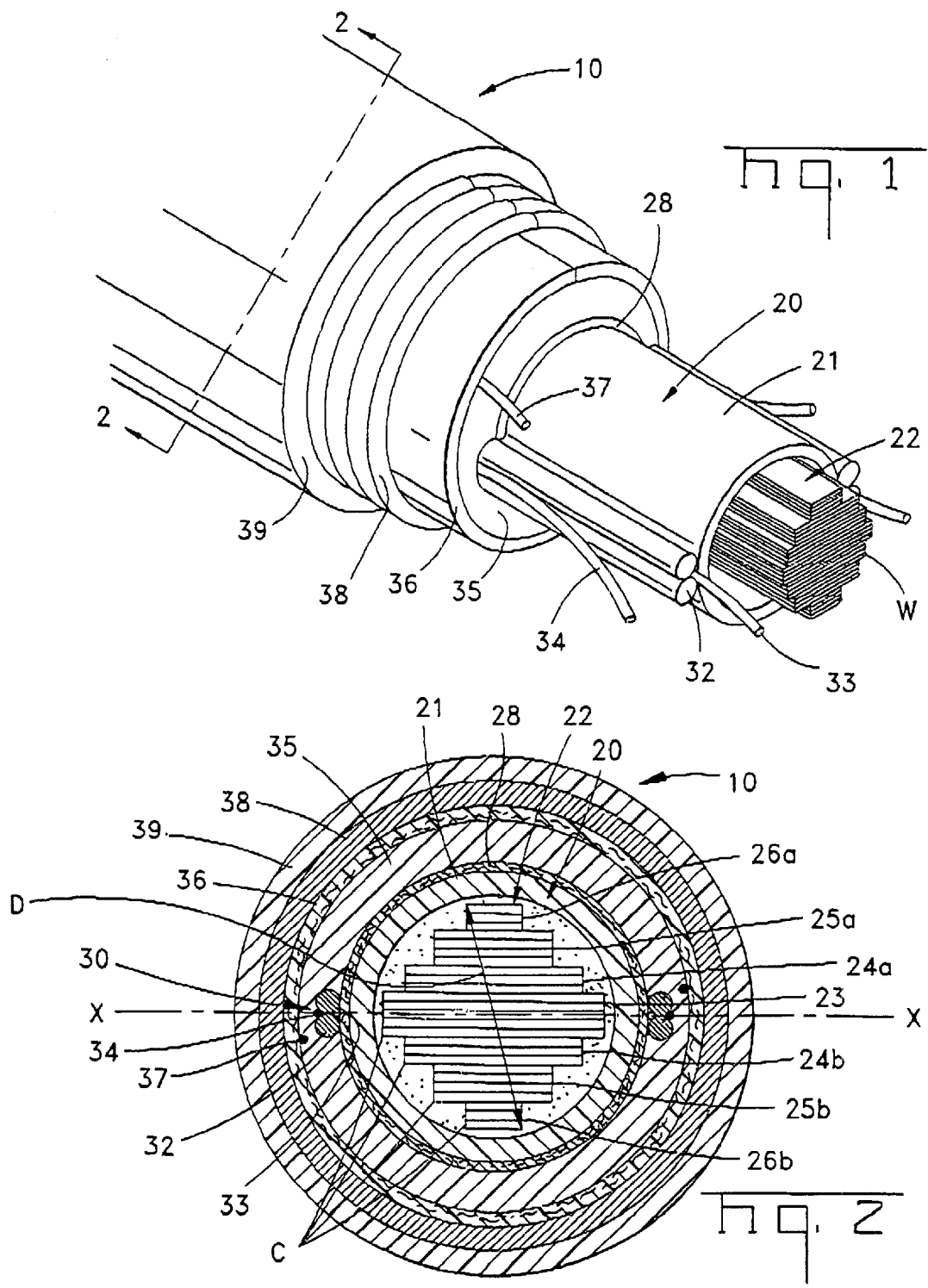

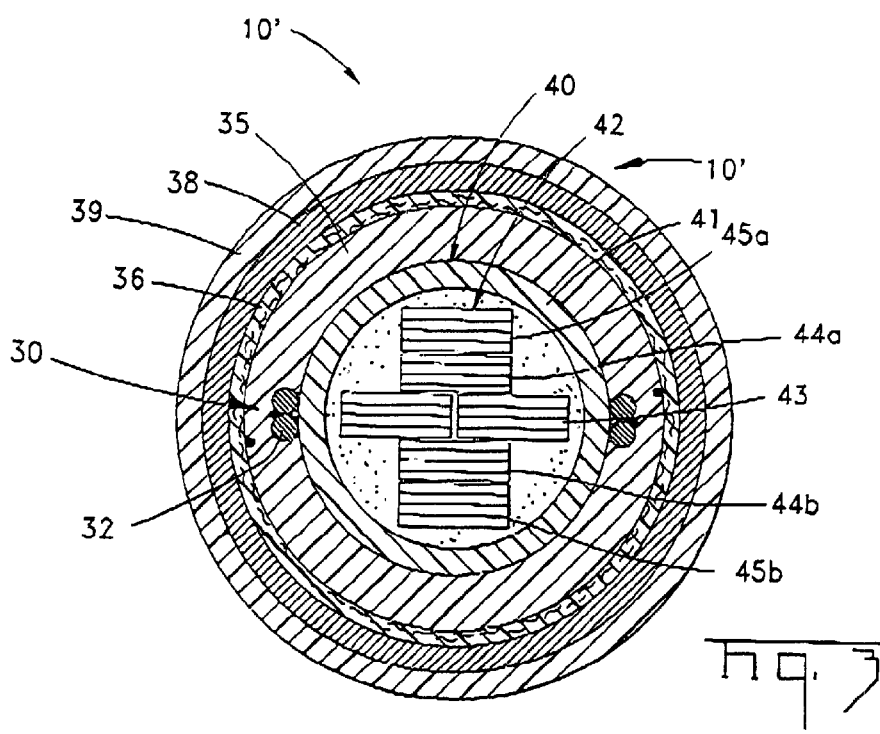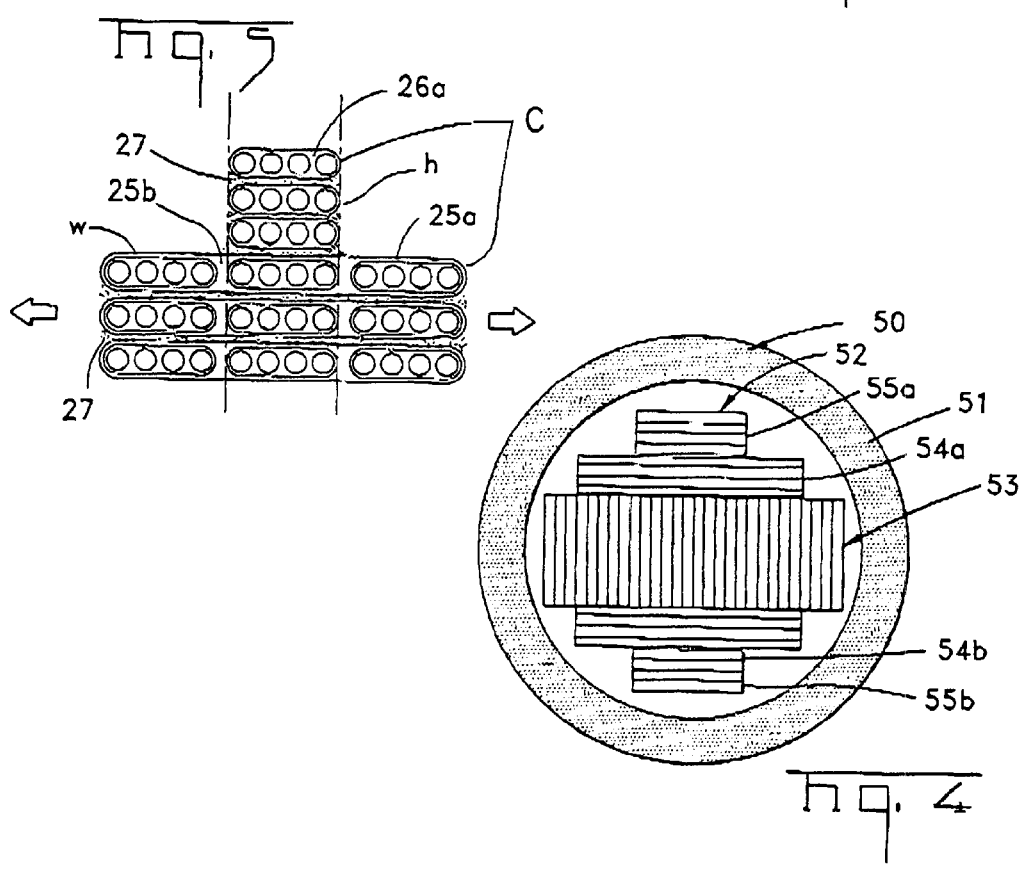

FIBER OPTIC CABLE WITH PROFILED GROUP OF OPTICAL FIBERS

The present application is a Continuation-in-part of application Ser. No. 09/283,080 filed Mar. 31, 1999, now U.S. Pat. No. 6,192,178, the contents of which is incorporated by reference herein.

The present invention relates to fiber optic cables, and, more particularly, to fiber optic cables including sets of optical fibers.

BACKGROUND OF THE INVENTION

Conventional fiber optic cables include optical fibers that conduct light which is used to transmit voice, video, and data information. Where the fiber optic cable is subjected to forces, the optical fibers may be stressed and attenuation of the transmitted light may occur. It is therefore important for fiber optic cables to be constructed in a robust manner whereby stress-induced attenuation can be avoided or minimized. In addition, although it is generally desirable for a fiber optic cable to have a high optical fiber count, it is also desirable for the cable to be as compact as possible, thereby maximizing optical fiber density.

HIGH FIBER COUNT CABLES IN GENERAL

High fiber count cables can be classified into three general design categories, namely: single tube, stranded tube, and slotted core. Each category may include optical fiber ribbons and/or bundled optical fibers. The physical characteristics and/or optical performance of high fiber count cable designs can include, for example: general properties such as packing density, cable diameter, weight and flexibility; cable performance attributes such as environmental performance, mechanical performance, and polarization mode dispersion attributes; and field characteristics such as installation methods, cable stripping, and mid-span access.

BACKGROUND ART

Known cable designs that include optical fiber ribbons, and are classifiable into one of the three general categories, can define a backdrop for the present invention. For example, U.S. Pat. No. 5,608,832 which is incorporated by reference herein, includes a central member. More specifically, the design includes stacks of optical fiber ribbons formed by three optical fiber ribbons disposed in respective three-sided chamber elements of approximately a U-shaped cross section. The chamber elements are stranded around the central member which includes a tensile element and an extruded plastic layer. U.S. Pat. No. 5,249,249 and U.S. Pat. No. 5,293,443 which are respectively incorporated by reference herein, also disclose designs employing central members. The respective disclosures describe a compartment holding at least two side-by-side stacks of optical fiber ribbons.

U.S. Pat. No. 5,177,809 which is incorporated by reference herein, includes a slotted rod. Disclosed therein is an optical cable having a plurality of light waveguides in a group of bands that are arranged in longitudinally extending chambers of a slotted rod. Each of the chambers in the slotted rod can have an increasing width as the radial distance from the center of the slotted rod increases. The bands can be arranged in sub-stacks having increasing widths corresponding to the increased width of the chamber. In another embodiment, each of the bands in the stack has an increasing width in the radial direction to fill the chamber.

Alternatively, each of the chambers has a rectangular cross section, with the cross section increasing in a step-like manner due to steps formed in partitions separating the chambers. The bands that are arranged in the chambers are arranged in sub-stacks to fill each portion of the chamber.

The background of the present invention can include single tube cable designs having optical fiber ribbons. For example, U.S. Pat. No. 5,369,720 which is incorporated by reference herein, discloses a stack of optical ribbons secured within a metal tube by an adhesive. The adhesive has a peel strength sufficiently low to permit separation of individual optical ribbons from the stack. One embodiment includes a stack of optical ribbons having a number of ribbons arranged generally parallel to each other, and a further pair of ribbons arranged perpendicular to the generally parallel ribbons and in abutment with edges thereof. In addition, U.S. Pat. No. 5,878,180 discloses a single tube cable including a number of superimposed and adjacent stacks of optical fiber ribbons. The stacks of optical fiber ribbons are arranged over and/or adjacent to each other and in parallel. Another single tube variation, is disclosed in EP-A2-0495241 wherein optical fiber ribbons are tightly received in a zigzagged waterblocking tape. The ribbons are apparently pressed into slots in the zigzagged waterblocking tape. The zigzagged waterblocking tape disadvantageously consumes valuable space inside the tube, increases production costs, requires specialized manufacturing procedures, restricts relative movement of the ribbons during cable bending, increases friction between cable components, and/or adds size and stiffness to the cable.

In addition to attaining a desired fiber count, fiber optic cables should be able to withstand longitudinal compression and tension, and they typically include strength members for these purposes. However, the strength members may disadvantageously affect cable bending performance during installation, and may hinder optical fiber access. A fiber optic cable having strength members located in a single plane generally will experience a preferential bending action favoring bending of the cable out of the plane defined by the strength members. On the other hand, a fiber optic cable having strength members at spaced locations encircling the center of the cable will not have a preferential bend, but the strength members typically include a helical lay so that the cable can be bent. Even taking into account the helical lay of the strength members, when bent in generally any axis, cables of the non-preferential bend type may be very stiff, a characteristic which may be highly undesirable depending upon installation requirements. Thus a cable of the preferential bend type will typically experience ease of cable bending in a preferred plane, and, as there are less strength members to deal with, may present a less time consuming optical fiber access procedure. A cable designer may therefore balance the need to have sufficient cable components for resisting crush, compression, and tension loads, against the size and stiffness contributions of the cable components that may render the cable difficult to install in a cable passageway.

OBJECTS OF THE INVENTION

The present inventions relate to a fiber optic cable having a tube assembly therein. The tube assembly includes an optical fiber group in a tube. The optical fiber group comprises a medial optical fiber subgroup and lateral optical fiber subgroups adjacent thereto. The subgroups define a step-like profile for maximizing optical fiber packing density of the tube assembly and/or defining a high fiber count cable. In exemplary mono-tube embodiments, a diagonal free space is defined as the tube inner diameter minus the diagonal length of the cross-section of the profile of the optical fiber ribbon stack, the diagonal free space being about 2 mm to about 5 mm. In a multi-tube embodiment, diagonal free space can be about 0.5 mm to about 2 mm. In other embodiments, corner fibers can have a delta optical attenuation of less than about 0.05 dB/Km for a wavelength of @1550 nm over a 100 meter length 40" to 70" drum at room temperature.

BRIEF DESCRIPTION OF THE DRAWING FIGURES

FIG. 1 is an isometric view of a fiber optic cable according to the present invention.

FIG. 2 is a cross sectional view of the cable of FIG. 1 taken at line 2—2.

FIG. 3 is a cross sectional view of a fiber optic cable according to the present invention.

FIG. 4 is a cross sectional view of a fiber optic cable according to the present invention.

FIG. 5 is a cross sectional view of a portion of a optical fiber group according to the present invention.

DETAILED DESCRIPTION OF THE INVENTIONS

Figure 6:
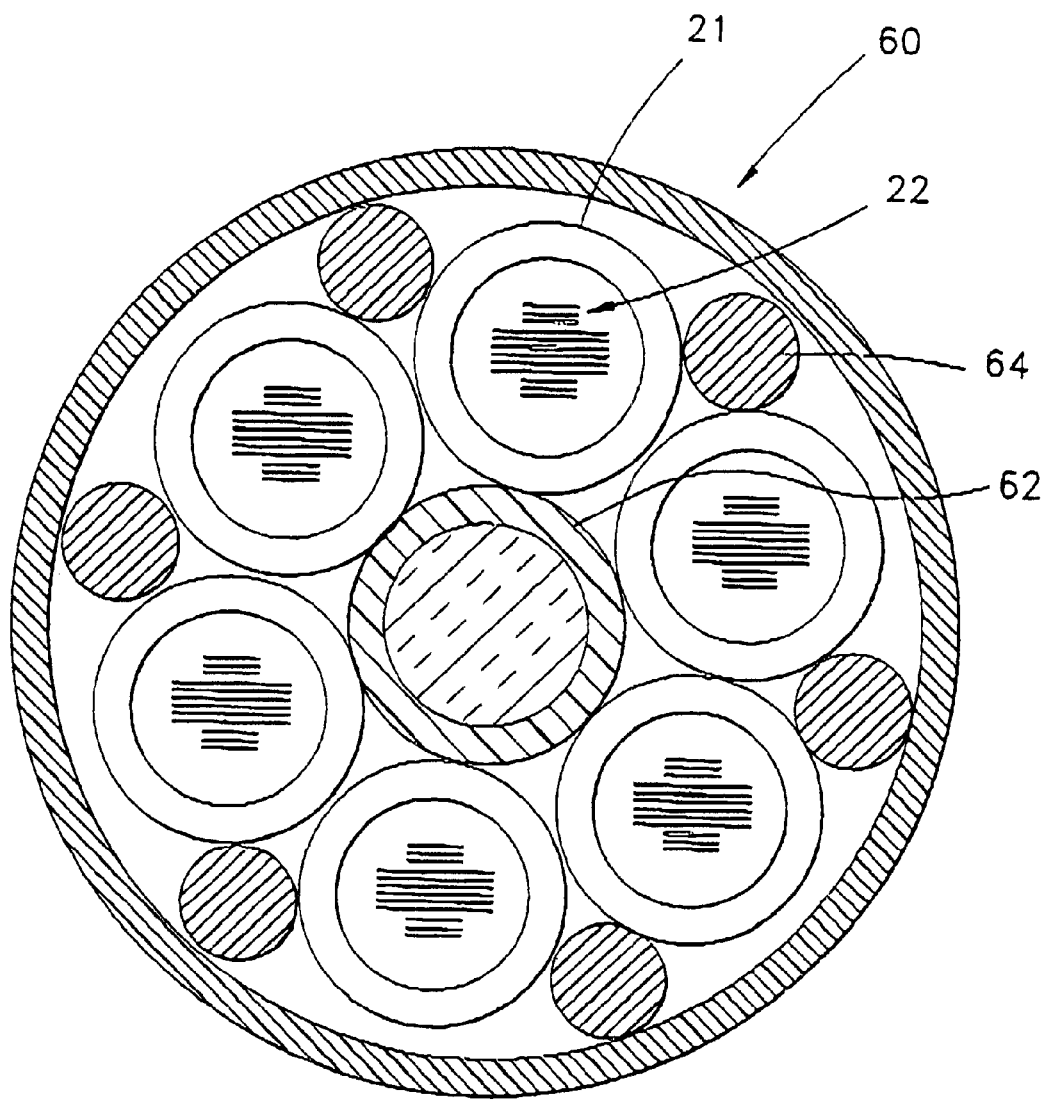
FIG. 6 is a cross-sectional view of another embodiment of the present invention.

Referring to FIGS. 1–2, a first embodiment of the present inventions comprises a tube assembly 20 that includes a tube 21 having an optical fiber group 22 therein. Optical fiber group 22 comprises optical fiber subgroups having respective sets of optical fibers, for example, a set of optical fibers comprises at least one optical fiber ribbon. More specifically, tube 21 can include an optical fiber ribbon group 22 comprising a medial subgroup 23 of optical fiber ribbons with at least one set of lateral subgroups 24a, 24b on opposing sides thereof. Lateral subgroups 24a, 24b can be immediately flanked by lateral subgroups 25a, 25b, and lateral subgroups 25a, 25b can be immediately flanked by lateral subgroups 26a, 26b. In a preferred exemplary embodiment, medial subgroup 23 contains sixteen layers of 36 optical fiber ribbons, each having three 12-fiber subunits; and lateral subgroups 24a, 24b contain six layers each of optical fiber ribbons, each having two 12-fiber subunits.

Lateral subgroups 24a, 24b; 25a, 25b; 26a, 26b may have respective generally equal fiber counts respectively. For example, the optical fiber count in lateral subgroups 24a, 24b can be in the range of about 2 to about 576 fibers, the optical fiber count in lateral subgroups 25a, 25b can be in the range of about 2 to about 432 fibers, and the optical fiber count in lateral subgroups 26a, 26b can be in the range of about 2 to about 216 fibers. The optical fiber count in medial subgroup 23 can be in the range of about 3 to about 1008 fibers. A total fiber count for tube assembly 20 can be in the range of about 7 to about 2,000 or more fibers, most preferably about 864 fibers. The subgroups contain at least one respective layer having at least one optical fiber ribbon. A layer in a subgroup can comprise one continuous ribbon or one or more separate ribbons in general edge-to-edge alignment, touching or with gaps between the edges.

Each subgroup can be progressively smaller, for example, starting at the medial subgroup and moving to the lateral subgroups. Optical fiber ribbon group 22 can therefore define a step-like profile that can be generally symmetrical about medial subgroup 23. The step-like profile can define a high fiber packing density by substantially filling up the volume of tube 21 with, for example, sets of optical fiber ribbons.

In other words, the fiber packing density of tube assembly 20 can be optimized by the step-like profile. The individual steps of the step-like profile can include a width w (FIG. 5) of at least about one optical fiber diameter, e.g., about 260 microns (±20 microns), and a height h of at least about one ribbon thickness, e.g., about 290 microns (±20 microns). The width w and/or height h can be constant from step to step, or they become progressively smaller or larger from step to step in the profile (FIG. 1). Further, the width w can be a multiple of a parameter of an optical fiber ribbon, e.g., an integer multiple of a geometric parameter. For example, for facilitating separation of optical fiber subunits from optical ribbon group 22, width w can be roughly equal to the width of an optical fiber subunit within at least one optical fiber ribbon (FIG. 5). Moreover, edges of the subgroups can be aligned with a separation feature of an optical fiber ribbon, for example, a subunit separation area 25b between subunits (FIG. 5), or a separation member embedded in the optical fiber ribbon (not shown).

Tube assemblies including variations of optical fiber ribbon group 22 can be made according to the present invention. For example, a tube assembly 40 (FIG. 3) can be made having an optical fiber ribbon group 42 comprising a medial subgroup 43 of optical fiber ribbons separated by a gap with at least one set of lateral subgroups 44a, 44b on opposing sides thereof. Lateral subgroups 44a, 44b can be immediately flanked by lateral subgroups 45a, 45b having, for example, optical fiber counts that are generally equal to those of subgroups 44a, 44b. The subgroups of the present invention can be distinguished from each other by, for example, the number of fibers, subunits, and/or separation features thereof. In addition, a tube assembly 50 (FIG. 4) can be made having an optical fiber ribbon group 52 in a tube 51 comprising a medial subgroup 53 turned on edge with respect to at least one set of lateral subgroups 54a, 54b on opposing sides thereof. Lateral subgroups 54a, 54b can be immediately flanked by lateral subgroups 55a, 55b.

At least some of the optical fiber ribbons and/or subgroups of optical fiber groups 22, 42, 52 have low frictional characteristics for sliding contact therebetween. For example, certain optical fiber ribbons and/or each ribbon in an entire subgroup 22, 42, 52 can be separated form adjacent ribbons by a film thickness of a lubricant 27 shown schematically in FIG. 5. Lubricant 27 can be a viscous substance, for example a gel, a liquid, or a grease-like substance any of which permit sliding contact between optical ribbons within a subgroup and/or subgroups 22, 42, 52. A suitable pre-wet method for applying a lubricant between optical ribbons is disclosed in U.S. Pat. No. 5,348,586 which is incorporated by reference herein. According to a preferred embodiment, the film thickness is preferably a prewet layer thickness of grease applied between optical fiber ribbons, which thickness is preferably between about 0.01 mm and 0.10 mm, but is most preferably about 0.01 mm. The prewet layer thickness is controlled so that the overall cable diameter is minimized, and to insure that attenuation is not induced by the ribbon print identification. Ribbon print identification is described in U.S. Pat. No. 6,064,798, which is incorporated by reference herein. In a preferred embodiment, prewet coverage should be complete with print spacing on inner ribbons of about 3.5 mm to about 4.0 mm, and more preferably about 3.80 mm to about 3.85 mm or more characters/cm. In addition, the optical fiber ribbons or subgroups can be separated by a lubricant comprising a superabsorbent substance dispersed therein. Alternatively, the outer common matrix of one or more optical ribbons can include a non-compatible material, e.g. a silicone containing material, that migrates to the surface thereof for low frictional characteristics. Moreover, low frictional characteristics can be attained without the use of a lubricant or non-compatible substance. For example, one or more subgroups can contain one or more optical fiber ribbons having an advantageously low coefficient of friction matrix material as described in U.S. Pat. No. 5,561,730 which is incorporated by reference herein.

For maintaining stack integrity, optical fiber ribbon groups 22, 42, 52 can be held together by binders (not shown). Optical fiber ribbons or subgroups can be bonded together with a cured resin, e.g., a UV curable acrylate material. Extrusion of tubes 21, 41, 51 about ribbon groups 22, 42, 52 can be accomplished in a buffering line, for example, as disclosed in U.S. Pat. No. 5,312,499 which is incorporated by reference herein. More specifically, optical fiber ribbon groups 22, 42, 52 can be fed through a device that extrudes tubes 21, 41, 51 and applies a waterblocking grease therearound. As this occurs, ribbon groups 22, 42, 52 can be helically twisted as a unit in a lay length in the range of about 200 mm to about 1500 mm along its longitudinal axis. The buffering line can be constructed so that a clearance is defined between optical fiber ribbon groups 22, 42, 52 and the wall of tubes 21, 41, 51.

Any of tube assemblies 20, 40, 50 can be used as a component in various fiber optic cable applications. For example, at least one tube assembly 20, 40, 50 can be stranded about a central member of the kind disclosed in U.S. Pat. No. 5,621,841 which is incorporated by reference herein. Alternatively, at least one tube assembly 20, 40, 50 can be disposed in a slot of a slotted rod of the kind disclosed in U.S. Ser. No. 08/935,173 which is incorporated by reference herein. Moreover, a tube assembly 20, 40, 50 can be used to define a core in a mono-tube application.

To illustrate, an exemplary application of tube assembly 20 functioning as a core of a mono-tube type fiber optic cable 10 (FIGS. 1–2) will be described. In addition, tube assembly 40 is shown as the core of a mono-tube type fiber optic cable 10' (FIG. 3). Fiber optic cable 10 includes tube assembly 20 as the core thereof, and one or more strength assemblies 30 are adjacent thereto for resisting bend, crush, and longitudinal compression and tension forces. Tube 21 preferably includes a grease-like water blocking substance therein.

A typical strength assembly 30, which can be supported by tube 21, includes one or more strength members, and may include portions of a first plastic jacket, an armor tape, and a second plastic jacket. In the preferred embodiment, a water-swellable tape 28 is interposed between tube 21 and the strength assemblies. The tube tensile modulus is preferably about 800 MPa to about 1500 Mpa, but is most preferably about 1000 MPa to about 1200 MPa. In the embodiments of FIGS. 1–3, and as disclosed in U.S. Ser. No. 08/990,974, now U.S. Pat. No. 6,101,305 which is incorporated by reference herein, strength assembly 30 may include one or more longitudinally disposed strength members 32, a portion of a first jacket 35, a portion of a corrugated or flat armor tape 38 of the metallic or plastic type, and a portion of a second jacket 39. However, where an armor layer and a second jacket are not required, jacket 35 may comprise the exterior surface of the cable in which case strength assembly 30 would not include those components. The jacket material is preferably a medium density polyethylene material, more preferably with a low melt temperature characteristic for avoiding melting through tape 28. Jacket 35 preferably has an outside diameter of about 26 mm or less, rendering the cables suitable for installation in a duct having an ID of about 1.25 inches.

Strength assemblies 30, when located on opposite sides of tube 21, can impart a preferential bend resistance to fiber optic cables 10, 10'. A preferential bend plane X—X (FIG. 2) is generally defined by strength members 32. At least one of strength assemblies 30 includes a strength member 32 coupled to first jacket 35; however, all strength members should be coupled to jacket 35. A thin waterblocking layer 36, for example a conventional waterblocking tape, can be disposed between first and second jackets 35, 39. Alternatively, waterblocking layer 36 may be a water swellable coating deposited on tape 38. Ripcords 34 and 37 may be placed along strength members 32 and adjacent tape 36, respectively (FIGS. 1–2).

Strength members 32 can be made of a pre-formed metallic material, e.g., steel, or a dielectric material, e.g., glass reinforced plastic and are preferably about 1.75 mm to about 2.25 mm in diameter but most preferably about 2.0 mm in diameter. In addition, the preferred material for the strength members is one which produces a minimum of hydrogen at high temperatures. Strength members 32 preferably include a thin coating of a low-modulus thermoplastic resin compound for waterblocking purposes. The resin may include a water swellable material, for example, a superabsorbent substance. The resin preferably enhances adhesion between strength members 32 and jacket 35. A given strength assembly 30 can include two or more strength members 32 that can be coupled to each other by action of the water swellable material, and can be coupled to jacket 35. As an alternative or in addition to the water swellable material, waterblocking yarns 33 may be disposed along strength members 32 (FIGS. 1–2). In the preferred embodiment, the strength members determine the E·A of the cable design. E·A is the modulus (E) of the strength element material times the cross-sectional area (A). This value is used to determine the tensile strength and anti-buckling strength of the cable. A preferred E·A is in the range of about 500,000 to about 900,000 MPa*mm$^2$, but is most preferably about 700,000.

Fiber optic cables of the present inventions are preferably constructed for outdoor applications. During bending of the cable, optical fiber ribbon group 22, 42 can bend about plane X, and the respective subgroups and/or the optical fiber ribbons therein may slide relative to each other for relieving stress in the optical ribbons. Additionally, the clearance between tube 21, 41 and optical fiber ribbon groups 22, 42 allows for some adjustment in the lay length of group 22 during cable bending. Diagonal free space is defined as the tube inner diameter minus the maximum diagonal length of the cross-section of the ribbon stack profile, i.e., the stack diagonal length. According to the present inventions, diagonal free space is controlled for cable quality as defined in Bellcore/Telcordia GR-20-CORE, Issue Jul. 3, 1988. In preferred embodiments, the diagonal free space of the ribbon stack profile is about 2 mm to about 5 mm, but is most preferably about 3 mm. In an exemplary 864 fiber cable, the ribbon stack diagonal is preferably about 10 mm to about 13 mm. In the preferred 864 fiber embodiment, medial subgroup 23 contains sixteen layers of 36 optical fiber ribbons, each having three 12-fiber subunits; in addition, lateral subgroups 24a, 24b contain six layers each of optical fiber ribbons, each having two 12-fiber subunits.

Having four subgroups can allow group 22 to adjust during bending and facilitate termination and/or separation procedures. In an exemplary embodiment, the preferred ribbon stack configuration has potential points of contact with tube 21, that is, contact of corner fibers C (FIGS. 2 and 5). In preferred embodiments, a corner fiber optical attenuation delta of less than about 0.05 dB/Km for a wavelength of @1550 nm over a 100 meter length is achieved on a 40" to 70" drum, more preferably 60" drum, at room temperature.

FIG. 6 shows an alternative embodiment of a fiber optic cable of the present inventions. Fiber optic cable 60 has one or more tube assemblies 20, 40, or 50 stranded about a central member 62. In a preferred embodiment, tubes 21 can be stranded about a central member in a cable constructed generally in accordance with U.S. Pat. No. 6,014,487, which is incorporated by reference herein. Preferably, the outside diameter of cable 60 is such that the cable is installable in a 1.50-inch duct.

In a preferred embodiment, cable 60 contains tubes 21 with eight 24-fiber ribbons, and eight 12-fiber ribbons in a stepped ribbon stack configuration for high fiber packing density. The ribbon stack diagonal of the stepped profile is about 7.0 mm±1.0 mm, with a tube inner diameter of about 8.0 mm and a tube outer diameter of about 10.0 mm. The preferred diagonal free space is about 0.5 to about 2.0. Central member 62 is preferably a thermoplastic-coated glass reinforced plastic strength element having a diameter of about 9.5 mm. Filler rods 64 may be disposed between the tubes, in lieu of any of the filler rods small buffer tubes with colored fibers could be included to further increase the fiber count. The overall cable diameter would be about 32.0 mm or less and would likely be installable in a 1.50-inch duct. Fiber packing density could be increased further by utilizing, for example, 24-fiber, 18-fiber, 12-fiber, and/or 6-fiber ribbons.

The present inventions have thus been described with reference to the exemplary embodiments, which embodiments are intended to be illustrative of inventive concepts rather than limiting. Persons of ordinary skill in the art will appreciate that variations and modifications of the foregoing embodiments may be made without departing from the scope of the appended claims. Tube assemblies 20, 40, 50 may be used in a mono-tube fiber optic cable of the non-preferential bend type. Tube assemblies 20, 40, 50 can include more or less lateral subgroups, and/or no medial subgroup. The step-like profile can include the interposition of a subgroup having a larger or smaller fiber count than neighboring subgroups. Tubes 21, 41, 51 can comprise a non-round or metallic shape, and/or a jacket with embedded strength members as disclosed in U.S. Pat. No. 4,887,354 incorporated by reference herein. Tubes 21, 41, 51 can be formed of one or more layers of thermoplastic material, e.g. polyethylene, polypropylene, and/or polystyrene, that is chemically suitable for use with any lubricant, superabsorbent, and/or grease-like waterblocking substance therein. Each ribbon/subunit in a subgroup can be marked for ease of identification even in the event the subgroup shifts during cable bending. Further, the optical fiber subgroups can respectively include generally unequal optical fiber counts (not shown). Optical fiber subgroups can include ribbons with subunits as disclosed in U.S. Pat. No. 5,524,164, and or separable ribbons as disclosed in U.S. Pat. No. 5,442,722, which are incorporated by reference herein. In addition, the optical fiber group can include optical fiber sets other than or in addition to ribbons, for example, fiber bundles, dropcords, zipcords, and/or interconnect cables. Optical fibers that are less bend-sensitive can be placed in predefined locations in a group/subgroup/ribbon for maintaining a low overall attenuation of the fiber optic cable. Tube 21 can be coated or impregnated with a superabsorbent material. At least some of the flanking optical fiber subgroups can be disposed edge-to-edge with respect to each other and/or the medial subgroup.

What is claimed is:

1. A fiber optic cable having a tube assembly, said tube assembly comprising:

a tube; and an optical fiber ribbon stack comprising optical fiber ribbons arranged at least partially in a gradually decreasing optical fiber count profile and comprising a diagonal free space, said diagonal free space being defined as the tube inner diameter minus the diagonal length of the cross-section of said profile of said optical fiber ribbon stack, said diagonal free space being about 2 mm to about 5 mm.

2. The fiber optic cable of claim 1, said diagonal free space being about 3 mm.

3. The fiber optic cable of claim 1, a prewet layer of grease being disposed between at least some of said optical fiber ribbons, said prewet layer thickness being about 0.01 mm to about 0.10 mm.

4. The fiber optic cable of claim 1, at least some of said optical fibers ribbons comprising print identification markings in the form of characters with a print spacing, said print spacing being about 3.5 mm to about 4.0 mm.

5. The fiber optic cable of claim 1, a tensile modulus of said tube being about 800 MPa to about 1500 MPa.

6. The fiber optic cable of claim 1, said optical fiber cable comprising strength members, said strength members defining an E·A value of about 500,000 to about 900,000 MPa*mm².

7. The fiber optic cable of claim 1, said profile comprising corner fibers, at least some of said corner fibers having a delta optical attenuation of less than about 0.05 dB/Km for a wavelength of @1550 nm over a 100 meter length about on a 40" to 70" diameter drum.

8. The fiber optic cable of claim 1, said diagonal length of said profile comprising a maximum value of about 10 mm to about 13 mm.

9. A fiber optic cable having a tube assembly, said tube assembly comprising:

a tube; and an optical fiber ribbon stack comprising optical fiber ribbons arranged at least partially in a gradually decreasing optical fiber count profile, said profile comprising corner fibers, at least some of said corner fibers having a delta optical attenuation of less than about 0.05 dB/Km for a wavelength of @1550 nm over a 100 meter length 40" to 70" drum at room temperature.

10. The fiber optic cable of claim 9, said profile defining a diagonal free space, said diagonal free space being defined as the tube inner diameter minus the diagonal length of the cross-section of the optical ribbon stack, said diagonal free space being about 2 mm to about 5 mm.

11. The fiber optic cable of claim 9, a prewet layer of grease disposed between at least some of said optical fiber ribbons, said prewet thickness being about 0.01 mm to about 0.10 mm.

12. The fiber optic cable of claim 9, at least some of said optical fibers ribbons comprising print identification markings in the form of characters with a print spacing, said print spacing on at lest some of said optical fiber ribbons being about 3.5 mm to about 4.0 mm.

13. The fiber optic cable of claim 9, a modulus of said tube being about 800 MPa to about 1500 MPa.

14. The fiber optic cable of claim 9, said optical fiber cable comprising strength members, said strength members defining an E·A value of about 500,000 to about 900,000 MPa*mm².

15. A fiber optic cable having a tube assembly, said tube assembly comprising:

an optical fiber ribbon stack comprising optical fiber ribbons arranged at least partially in a gradually decreasing optical fiber count profile and comprising a diagonal free space, said diagonal free space being defined as the tube inner diameter minus the diagonal length of the cross-section of said optical fiber ribbon stack, said diagonal free space being about 0.5 mm to about 2 mm.

16. The fiber optic cable of claim 15, said optical fiber cable comprising at least two of said tube assemblies.

17. The fiber optic cable of claim 15, said tube assembly being stranded about a central member.

18. The fiber optic cable of claim 15, said fiber optic cable comprising an outside diameter of about 32 mm or less for installation in a 1.50-inch duct.

* * * * *